United States Patent [19]
Golliher et al.

[11] 3,708,568
[45] Jan. 2, 1973

[54] REMOVAL OF PLUTONIUM FROM PLUTONIUM HEXAFLUORIDE-URANIUM HEXAFLUORIDE MIXTURES

[75] Inventors: Waldo R. Golliher; Robert L. Harris; Reynold A. LeDoux, Jr., all of Paducah, Ky.

[73] Assignee: The United States of America as represented by the United States Atomic Energy Commission

[22] Filed: Oct. 20, 1970

[21] Appl. No.: 82,508

[52] U.S. Cl.................423/6, 423/19, 252/301.1 R
[51] Int. Cl. ...............................................C01g 56/00
[58] Field of Search.......55/74; 252/301.1 R; 23/332, 23/326, 337, 344, 352; 423/19, 6, 11, 251, 258

[56] References Cited

UNITED STATES PATENTS

| | | | |
|---|---|---|---|
| 3,615,267 | 10/1971 | Golliher et al............................23/343 |
| 2,843,453 | 7/1958 | Connick et al..........................23/332 |
| 3,165,376 | 1/1965 | Golliher...................................23/337 |
| 3,178,258 | 4/1965 | Cathers et al. .........................23/337 |
| 3,423,190 | 1/1969 | Steindler et al. .......................23/326 |

*Primary Examiner*—Carl D. Quarforth
*Assistant Examiner*—F. M. Gittes
*Attorney*—Roland A. Anderson

[57] ABSTRACT

This invention relates to a method of selectively removing plutonium values from a fluid mixture containing plutonium hexafluoride and uranium hexafluoride by passing the mixture through a bed of pelletized cobaltous fluoride at a temperature in the range 134° to 1,000° F. to effect removal of plutonium by the cobaltous fluoride.

3 Claims, No Drawings

REMOVAL OF PLUTONIUM FROM PLUTONIUM HEXAFLUORIDE-URANIUM HEXAFLUORIDE MIXTURES

BACKGROUND OF THE INVENTION

This invention was made in the course of, or under, a contract with the United States Atomic Energy Commission.

The present invention relates to the processing of uranium hexafluoride and more particularly to a process for selectively removing plutonium from mixtures of uranium hexafluoride and plutonium hexafluoride.

A principal source of uranium hexafluoride feed for uranium isotope separation by means of gaseous diffusion is derived from the processing of spent nuclear reactor fuels containing irradiated natural uranium. This material is reprocessed to recover plutonium and other transuranium elements. Reprocessing is effected by dissolving the irradiated uranium in nitric acid solutions and then extracting the uranium and plutonium values with an organic solvent. The uranium and plutonium are then separated by further solvent extraction or ion exchange cycles. The final purified uranium product is obtained in the form of a uranyl nitrate solution which is converted by subsequent processing to gaseous diffusion feed, $UF_6$, by calcining the uranyl nitrate to form $UO_3$, reducing the $UO_3$ to $UO_2$, reacting the $UO_2$ with HF to form $UF_4$, and then finally reacting the $UF_4$ with fluorine to produce the desired $UF_6$ feed. Although the bulk of the fission products and transuranium elements are removed by this processing scheme, the product still contains significant amounts of plutonium, the quantity of which varies with the irradiation history of the uranium and with the particular separation process used. Separation of plutonium from reprocessed $UF_6$ is desired because it represents a significant health hazard for personnel who operate and repair diffusion cascade equipment as well as for personnel who process the enriched $UF_6$ to nuclear fuels. In addition, the presence of plutonium adversely affects the efficiency of the diffusion isotope separation process. For these reasons, it has been determined that an acceptable plutonium concentration in $UF_6$ feed gas should not exceed about 1.0 part per billion of plutonium based on the weight of uranium in a particular gas feed mixture entering the cascade.

It is therefore the principal object of this invention to provide a method of decontaminating $UF_6$ from plutonium which effectively meets these criteria.

SUMMARY OF THE INVENTION

The present invention is predicated on the discovery that a porous bed of pelletized cobaltous fluoride will function to selectively remove plutonium from fluid mixtures of uranium hexafluoride and plutonium hexafluoride. In accordance with the present invention, a gaseous mixture containing $UF_6$ and $PuF_6$ is passed through a porous bed of cobaltous fluoride at a temperature in the range 134° to 1,000° F. to cause the plutonium hexafluoride to be selectively reduced to a nonvolatile form as $PuF_4$. To recover the deposited plutonium values, fluorine gas is passed through the cobaltous fluoride bed at a temperature in the range 700° to 900° F. to reconvert the contained plutonium to gaseous plutonium hexafluoride, which can then be separately recovered. The cobaltous fluoride can then be processed for reuse by contacting with gaseous hydrogen at a temperature in the range 400° to 500° F.

In order to practice this invention, a porous bed of cobaltous fluoride pellets is required. These pellets should have sufficient strength and structural integrity to withstand repeated oxidation-reduction cycles at temperatures ranging from 220° to as high as 700° F. Suitable pellets can be prepared by the procedure described in U.S. Pat. NO. 3,372,004, issued Mar. 5, 1968, in the name of Earl W. Richardson et al. Briefly, the method comprises mixing cobaltous fluoride with water to form a wet agglomerate and then heating the agglomerate to a separate sintering temperature of about 1,200° F. in an atmosphere of anhydrous hydrogen fluoride. A satisfactory alternate is to spray the damp agglomerate with water and then air-dry to form suitable pellets. The pellets are sized to produce a batch in the range 1.7 to 2.4 millimeters. A final drying of the sized pellets in anhydrous HF or nitrogen for about one hour at 300°F. serves to effect dehydration to eliminate or reduce the possibility for $UF_6$ to be hydrolyzed to a solid oxyfluoride. Under these conditions the dried pellets will have a surface area in the range 10 to 11 square meters per gram and a void fraction of from 0.75 to 0.85. The treated pellets are loaded into a column to form the required bed. Suitable means are provided to heat the cobaltous fluoride bed to a temperature which will maximize selective plutonium removal whereupon a gaseous mixture of uranium hexafluoride and plutonium hexafluoride is passed through the column to effect selective removal of plutonium.

Having described the invention in general terms together with the procedure for preparing the active ingredient needed to effect the desired separation or decontamination, the following example is provided as an exemplary embodiment.

EXAMPLE

A $UF_6$ gas stream containing 8000 parts per billion (ppb) $PuF_6$ was fed to the inlet of a trap filled with $CoF_2$ pellets. The trap was 1.87 inches in diameter by 12 inches long and contained 60 grams of $CoF_2$. The trap temperature was maintained at 300° F. while the gas mixture flowed therethrough at a superficial bed velocity of 0.25 foot per second. The inlet and outlet trap streams were sampled and analyzed for plutonium content.

Results showed the outlet gas contained 0.06 ppb Pu based on uranium content. This example is identified as Run 2 in the table below. The results of three other runs are also shown in the table.

The plutonium can be removed from the $CoF_2$ by contacting Pu fluorine at a temperature of 700° F. The $CoF_2$ can be reused in subsequent runs after a hydrogen reduction treatment; that is, by heating in $H_2$ at a temperature in the range 400° to 500° F. in order to regenerate the $CoF_2$.

TABLE

| Run Number | 1 | 2 | 3 | 4 |
| --- | --- | --- | --- | --- |
| Flow Time, hrs. | 52 | 24 | 24 | 18 |
| Superficial Bed Velocity, ft./sec. | 0.25 | 0.25 | 0.25 | 1.0 |
| Pressure, psia | 14.7 | 14.7 | 14.7 | 14.7 |
| Trap Temperature, °F. | 300 | 300 | 210 | 300 |

| Residence Time, sec. | 4.0 | 4.0 | 4.0 | 1.0 |
|---|---|---|---|---|
| Average Inlet, ppb Pu (U basis) | 700 | 7993 | 5747 | 889 |
| Average Outlet, ppb Pu (U basis) | 0.08 | 0.06 | 0.05 | 0.01 |
| Decontamination Factor | $8.8 \times 10^3$ | $1.3 \times 10^5$ | $1.1 \times 10^5$ | $0.9 \times 10^5$ |

The data in the table for the several runs make it clear that the cobaltous fluoride treatment is extremely effective in reducing the plutonium content of $UF_6$–$PuF_6$ streams. The best temperature condition for removal of plutonium appears to be in the range of 200° to 400° F., and preferably at a temperature of about 300° F. The superficial bed velocity of the gas stream should be such as to give a residence time of from 1 to about 10 seconds, typically at from 0.25 to 1 foot per second velocity. Under these conditions, decontamination factors of the order of $1 \times 10^5$ are routinely obtained.

What is claimed is:

1. A method for selectively removing plutonium values from a gaseous mixture of uranium hexafluoride and plutonium hexafluoride which comprises contacting said mixture with a bed of particulate cobaltous fluoride at a temperature in the range 200° to 400° F. to effect selective deposition of plutonium on the cobaltous fluoride.

2. The method according to claim 1 in which the plutonium remaining on the cobaltous fluoride bed is removed by treatment with fluorine gas at a temperature in the range 700° to 900° F.

3. A method for separating $UF_6$ from a gaseous mixture of uranium hexafluoride and plutonium hexafluoride which comprises passing said mixture through a particulate bed of cobaltous fluoride at a temperature in the range 134° to 1000° F. to effect selective reduction of plutonium to a lower oxidation state.

* * * * *